US009203907B2

United States Patent
Ma et al.

(10) Patent No.: US 9,203,907 B2
(45) Date of Patent: Dec. 1, 2015

(54) METHOD, SERVER AND CLIENT IN IMPLEMENTING SERVICE MASHUP FOR WEB APPLICATIONS INTEGRATIONS THROUGH DYNAMIC COOPERATION OF CLIENT AND SERVER

(75) Inventors: Qifeng Ma, Shenzhen (CN); Yan Li, Shenzhen (CN); Heiko Pfeffer, Berlin (DE); Steglich Stephan, Berlin (DE); Piotr Wrona, Berlin (DE)

(73) Assignees: HUAWEI TECHNOLOGIES CO., LTD., Shenzhen (CN); FRAUNHOFER-GESELLSCHAFT ZUR FORDERUNG DER, München (DE)

( * ) Notice: Subject to any disclaimer, the term of this patent is extended or adjusted under 35 U.S.C. 154(b) by 679 days.

(21) Appl. No.: 13/493,682

(22) Filed: Jun. 11, 2012

(65) Prior Publication Data

US 2012/0246213 A1   Sep. 27, 2012

Related U.S. Application Data

(63) Continuation of application No. PCT/CN2010/079693, filed on Dec. 13, 2010.

(30) Foreign Application Priority Data

Dec. 11, 2009   (CN) .......................... 2009 1 0260521

(51) Int. Cl.
*G06F 15/16* (2006.01)
*H04L 29/08* (2006.01)

(52) U.S. Cl.
CPC ............... *H04L 67/16* (2013.01); *H04L 67/20* (2013.01); *H04L 67/2804* (2013.01); *H04L 67/327* (2013.01)

(58) Field of Classification Search
CPC ....... H04L 67/16; H04L 67/20; H04L 67/327; H04L 67/2804

USPC .................. 709/201–203, 217–219, 223–224
See application file for complete search history.

(56) References Cited

U.S. PATENT DOCUMENTS 7,908,278 B2 * 3/2011 Akkiraju ................... G06F 8/34
707/748
8,321,792 B1 * 11/2012 Alur ....................... G06Q 10/10
715/742

(Continued)

FOREIGN PATENT DOCUMENTS

CN    1610444 A    4/2005
CN    1617542 A    5/2005

(Continued)

OTHER PUBLICATIONS

Summons to Attend Oral Proceedings issued in corresponding European Patent Application No. 07800993.3, mailed Sep. 14, 2012.

(Continued)

*Primary Examiner* — Bharat N Barot
(74) *Attorney, Agent, or Firm* — Brinks Gilson & Lione (57) ABSTRACT

Embodiments of the present invention disclose a service Mashup method implemented through dynamic cooperation of a client and a server, which includes: the server creates a Mashup application logic; the server binds a third-party service according to the Mashup application logic, and negotiates with the client to determine a specific bound service according to the local service bound by the client and the third-party service bound by the server; the server generates a service logic process according to the specific bound service and the Mashup application logic, and executes the service logic process in parallel with the client. Further, a Mashup server and a Mashup client are provided. The embodiments can improve the user experience of a Mashup service, simplify creation of a Mashup application, balance the processing capabilities of the client and the processing capabilities of the server, and properly ensure personal information security of a user.

16 Claims, 7 Drawing Sheets

(56) References Cited

U.S. PATENT DOCUMENTS

| | | | |
|---|---|---|---|
| 8,417,764 B2 * | 4/2013 | Fletcher | G06F 17/3089 709/203 |
| 2005/0170861 A1 | 8/2005 | Niemi et al. | |
| 2007/0002840 A1 | 1/2007 | Song et al. | |
| 2007/0094350 A1 | 4/2007 | Moore | |
| 2007/0156807 A1 | 7/2007 | Ma et al. | |
| 2008/0222237 A1 | 9/2008 | Nathan et al. | |
| 2008/0244091 A1 | 10/2008 | Moore et al. | |
| 2010/0211580 A1 * | 8/2010 | Sreekanth | 707/756 |
| 2010/0257242 A1 * | 10/2010 | Morris | G06F 17/3089 709/206 |
| 2010/0269149 A1 * | 10/2010 | Lee et al. | 709/206 |
| 2011/0047246 A1 * | 2/2011 | Frissora et al. | 709/219 |

FOREIGN PATENT DOCUMENTS

| | | |
|---|---|---|
| CN | 1663216 A | 8/2005 |
| CN | 1992888 A | 7/2007 |
| CN | 101351991 A | 1/2009 |
| CN | 101488151 A | 7/2009 |
| CN | 101405990 B | 8/2012 |
| EP | 1962186 A2 | 8/2008 |
| KR | 20070009517 A | 1/2007 |
| WO | WO 2007/074216 A1 | 7/2007 |

OTHER PUBLICATIONS

Summons to Attend Oral Proceedings issued in corresponding European Patent Application No. 09172967.3, mailed Sep. 13, 2012.

Xie et al., "SMU: Towards Cloud Oriented Service MashUp" 2009 Fifth International Conference on Semantics, Knowledge and Grid, IEEE Computer Society, 2009.

Extended European Search Report issued in corresponding European Patent Application No. 10835505.8, mailed Nov. 23, 2012.

Chinese Patent No. 102098211, issued on Aug. 8, 2012, granted in corresponding Chinese Patent Application No. 200910260521.X.

\* cited by examiner

FIG. 8B

METHOD, SERVER AND CLIENT IN IMPLEMENTING SERVICE MASHUP FOR WEB APPLICATIONS INTEGRATIONS THROUGH DYNAMIC COOPERATION OF CLIENT AND SERVER

CROSS-REFERENCE TO RELATED APPLICATIONS

This application is a continuation of International Application No. PCT/CN2010/079693, filed on Dec. 13, 2010, which claims priority to Chinese Patent Application No. 200910260521.X, filed on Dec. 11, 2009, both of which are hereby incorporated by reference in their entireties.

FIELD OF THE INVENTION

The present invention relates to a new Web-based data integration application, and in particular, to a service Mashup method implemented through dynamic cooperation of a client and a server, a server, and a client.

BACKGROUND OF THE INVENTION

Service Mashup (Mashup) is a technology for stacking and aggregating multiple different applications that support a Web API into a new Web application. A Mashup server is a Web integration platform. It allows a user to easily integrate data and resources that come from any application having a Web interface. The main functions of the Mashup server include: composing Mashup application logics, providing an execution environment for Mashup applications, and communicating with external data sources and subservices.

In the process of implementing the present invention, the inventor finds that the prior art has at least the following problems:

1. A Mashup server may provide many Mashup applications, but cannot ensure availability of the Mashup applications. When a user requests executing a Mashup service, a Mashup application probably fails due to the abnormality of a third-party data source or subservice, for example, due to an interface change or service address change or service termination performed by a third-party service provider. Consequently, the Mashup service users have poor experience.

2. The Mashup server provides miscellaneous services and information sources, and the user needs to analyze the third-party data source when using the services and information sources, which is rather inconvenient to the user.

3. In separate use of the capability of the Mashup client or server, the advantages and the features of the server and the client are not fully used. The Mashup server can only provide Mashup services and information sources for the user according to related Web services on the network, and lacks cooperation with the client.

4. When a Mashup application needs to use capabilities and data of a user terminal, the terminal is required to report the related content to the Mashup server or a third-party data source, which may infringe upon the user's privacy.

SUMMARY OF THE INVENTION

Embodiments of the present invention provide a service Mashup method implemented through dynamic cooperation of a client and a server, and also the corresponding server and client, so as to improve the experience of a Mashup service user, simplify creation of a Mashup application, balance the processing capabilities of the client or the processing capabilities of the server, and properly ensure personal information security of the user.

An embodiment of the present invention provides a service Mashup method implemented through dynamic cooperation of a client and a server, including:

creating, by the server, a Mashup application logic after receiving a Mashup service creation request sent by the client;

binding, by the server, a third-party service according to the Mashup application logic, and sending the bound third-party service and the created Mashup application logic to the client, so that the client binds a local service of the client according to the Mashup application logic; and negotiating with the client to determine a specific bound service according to the local service bound by the client and the third-party service bound by the server;

generating, by the server, a service logic process according to the specific bound service and the Mashup application logic; and invoking, by the server, the specific service according to the service logic process to execute the service logic process in parallel with the client.

An embodiment of the present invention provides another service Mashup method implemented through dynamic cooperation of a client and a server, including:

sending, by the client, a Mashup service creation request to the server, so that the server creates a Mashup application logic and binds a third-party service according to the Mashup application logic;

receiving, by the client, the bound third-party service and the created Mashup application logic sent by the server, and binding a local service according to the Mashup application logic;

reporting, by the client, the bound local service to the server, so that the server negotiates with the client to determine a specific bound service according to the local service bound by the client and the third-party service bound by the server and generates a service logic process according to the specific bound service and the Mashup application logic; and invoking, by the client, a terminal or an external service according to the service logic process to execute the service logic process in parallel with the server.

An embodiment of the present invention provides a Mashup server, including:

a service creating module, configured to create a Mashup application logic according to a Mashup service creation request sent by a client;

a service matching module, configured to: bind a third-party service according to the Mashup application logic created by the service creating module, and send the bound third-party service and the created Mashup application logic to the client, so that the client binds a local service of the client according to the Mashup application logic; and negotiate with the client to determine a specific bound service according to the local service bound by the client and the third-party service bound by the server;

a service logic parsing module, configured to generate a service logic process according to the specific bound service and the Mashup application logic;

a service execution engine module, configured to invoke the specific service according to the service logic process to execute the service logic process in parallel with the client; and a service synchronizing module, configured to synchronize state information between the client and the server during negotiation and execution of a Mashup service.

An embodiment of the present invention provides a Mashup client, including:

a service matching module, configured to: send a Mashup service creation request to a server, so that the server creates a Mashup application logic; receive the Mashup application logic created by the server and a third-party service that is bound according to the Mashup application logic; and bind a local service according to the Mashup application logic;

a service execution engine module, configured to: report, to the server, the local service bound by the service matching module, so that the server negotiates with the client to determine a specific bound service according to the local service bound by the client and the third-party service bound by the server, and generates a service logic process according to the specific bound service and the Mashup application logic; invoke the specific service according to the service logic process to execute the service logic process in parallel with the server; and a service synchronizing module, configured to invoke a terminal or an external service according to the service logic process to execute the service logic process in parallel with the server.

As can be learned from the technical solutions of the embodiments of the present invention, Mashup application logics are created by a server, and then Mashup applications are decoupled from third-party data sources, a direct interface between the client and each type of third-party data is shielded, and the creation of Mashup applications is simplified. The server negotiates with the client to determine the specific bound service, which can balance the processing capabilities of the client and the processing capabilities of the server; the Mashup application logics are distributed according to actual conditions, and are executed by the client and the server in parallel in a distributed manner, which may relieve the load of the server. Meanwhile, the Mashup applications related to user terminal capabilities and data can ensure security of user privacy properly, the data may not be uploaded onto a network, so as to avoid infringing upon the user privacy, and support more personalized service selection.

BRIEF DESCRIPTION OF THE DRAWINGS

To make the technical solutions in the embodiments of the present invention clearer, the accompanying drawings used in the description of the embodiments of the present invention are briefly described hereunder. Apparently, the accompanying drawings illustrate some embodiments of the present invention, and persons of ordinary skill in the art can derive other drawings from such accompanying drawings without making any creative effort.

DETAILED DESCRIPTION OF THE EMBODIMENTS

To make the objectives, technical solutions, and advantages of the present invention clearer, the following describes the technical solutions provided by the present invention in more detail with reference to embodiments and accompanying drawings. Evidently, the embodiments described herein are only some embodiments of the present invention, rather than all embodiments of the present invention. All other embodiments derived by persons of ordinary skill in the art from the embodiments given herein without making any creative effort shall fall within the protection scope of the present invention.

Figure 1:
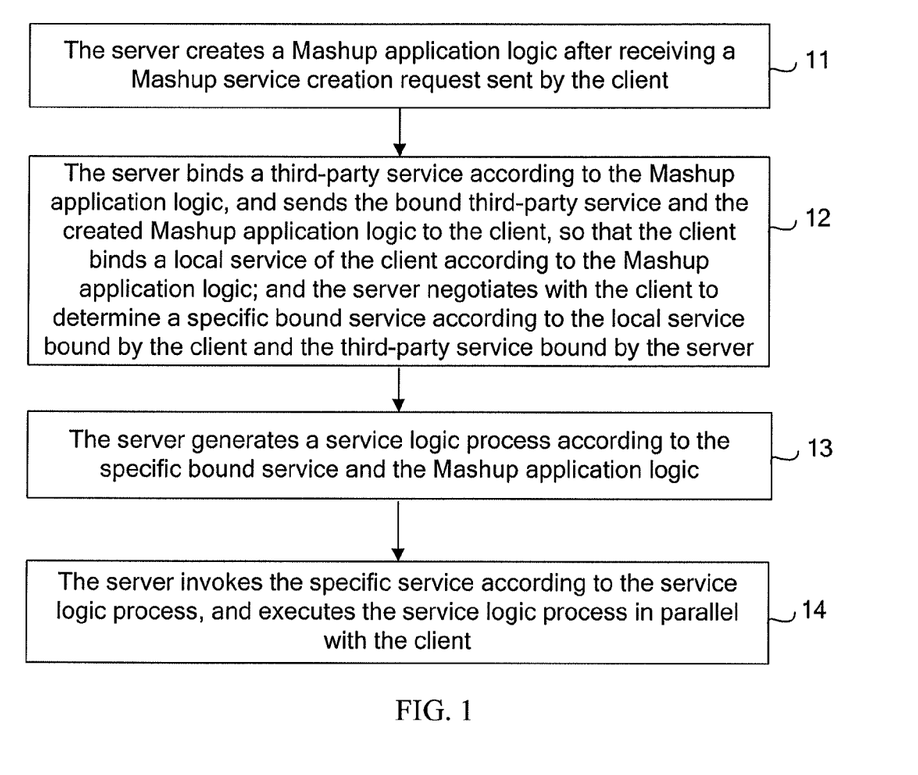
FIG. 1 is a flowchart of a service Mashup method implemented through dynamic cooperation of a client and a server according to an embodiment of the present invention.

As shown in FIG. 1, an embodiment of the present invention provides a service Mashup method implemented through dynamic cooperation of a client and a server. The method includes the following steps:

Step 11: The server creates a Mashup application logic after receiving a Mashup service creation request sent by the client.

The server employs a self-contained structured language, and generates a Mashup application logic that is based on extended HTML Tags or Java Script objects. The Mashup application logic includes a tag element name, an identifier ID, actions and parameters, and may be executed by the server and the client in a distributed manner.

For example, Mashup tag elements are extended based on related W3C XML standards:

element::=EmptyElement|STag content ETag|MashupElement

To include a Mashup service application into an HTML file, a <Mashup> tag may be defined:

```
MashupElement ::=   '<Mashup' [S 'id' Eq '"' (Letter)+ '"'] '>'
                    (MElement)*
                    '</Mashup>'
```

Each element includes a start tag and an end tag, or is empty:

```
MElement        ::= MEmptyElement | MSTag MContent METag
MEmptyElement   ::= '<' MResourceS '/>'
MSTag           ::= '<' MResourceS '>'
METag           ::= '</' MResourceE '>'
```

Each extended Mashup element represents an abstract resource and service. The resources and the services are provided by a relevant third-party specific application. Based on an XML standard, a global identifier GI is defined for each element. A Mashup element may use the global identifier to represent a third-party application that provides a service. Alternatively, the creator of a Mashup service may not necessarily specify a specific global identifier GI, but the server selects a specific third-party service automatically. For example, the following Mashup elements may be defined, and MresourceS and MResourceE represent the start tag and the end tag of a relevant element, respectively.

```
MResourceS   ::= Mmap | Mlocation | Mphoto | Mvideo | Mblog
| Mbookmark | Mevent |Msms | Mplace |
Msearch | Mproduct | Mcall | Memail |
Mcalendar |MrealEstate
MResourceE   ::= 'map' | 'location' | 'photo' | 'video' | 'blog' |
'bookmark' | 'event' | 'sms' |'place' | 'search' |
'product' | 'call' | 'email' | 'calendar' |
'realEstate'
```

Based on the foregoing definition, a brief Mashup application may be expressed simply in the following way:

```
<Mashup>
    <location />
    <map></map>
    <event></event>
    <photo></photo>
</Mashup>
```

Depending on a relevant specific service, each element may include multiple methods. To better use different methods of the services, it is necessary to add actions and attributes to the Mashup element, for example,

```
Mmap      ::= 'map' (MapAction) (GAtr)
MapAction::  = centerMap | unknownAction
centerMap::= S 'action' Eq ""center"" centerMapAtr
```

Such attributes may be replaced with specific methods in a Mashup execution process. In the foregoing Mashup example, the replacement may be:

```
<Mashup>
    <location action="getCurrentPosition"/>
    <map action="create"></map>
    <map action="addMarker"></map>
    <event action="search"></event>
    <photo action="search"></photo>
</Mashup>
```

The extended Mashup Tag makes it conveniently to integrate various third-party application resources, mainly complies with an HTML normal form, and may be a nested element. The specific content of the extended Mashup tag may be empty, a text, or other HTML elements. For example,
MContent::=
(element|PCData|Reference|CDSect|PI|Comment|MElement)*

Step 12: The server binds a third-party service according to the Mashup application logic, and sends the bound third-party service and the created Mashup application logic to the client, so that the client binds a local service of the client according to the Mashup application logic; and the server negotiates with the client to determine a specific bound service according to the local service bound by the client and the third-party service bound by the server.

QoS information, such as average service response time and/or exception probability on the server, may be used for reference when the server binds the third-party service. Statistics of such information are collected persistently in the execution process. Other relevant information, such as user preference, published by a user may also be used for reference. At the time of matching a service, the service may be selected according to the user preference, such as a rule for selecting a service among the same type of services. The information dynamically reported as permitted by the user may also be used for reference. The private information of the user, as permitted by the user, may be sent to the server for reference in binding the service.

When the client binds a local service supported by the client, public or non-public user information may be used for reference. When the client matches a specific service according to the abstract service logics delivered by the server, invoked services may be the user's personal information that is based on the terminal and is not suitable for running on the server. All such services are bound by the client on a terminal side directly.

When the local service bound by the client is the same as the third-party service bound by the server, the service bound by the client and the server is used; when the service bound by the client is different from the service bound by the server, the server preferentially uses the service bound by the client.

Step 13: The server generates a service logic process according to the specific bound service and the Mashup application logic.

Step 14: The server invokes the specific service according to the service logic process to execute the service logic process in parallel with the client.

In the execution process, when synchronization with the client is required, the server sends a synchronization request to the client or waits for synchronization information from the client. Specifically, with respect to relevant state information set for the Tag or JS object of the Mashup application logic, the server and the client perform synchronization operations based on different states in the service execution process; when requiring information from the opposite party, the server or client requests locking a correlated state, executes a correlation action, and sends correlated parameters to the opposite party.

In the service Mashup method implemented through dynamic cooperation of the client and the server in the embodiment of the present invention, the server creates Mashup application logics, and then Mashup applications are decoupled from third-party data sources, a direct interface between the client and each type of third-party data is shielded, and the creation of Mashup applications is simplified. The server negotiates with the client to determine the specific bound service, which can balance the processing capabilities of the client and the processing capabilities of the server; the Mashup application logics are distributed according to actual conditions, and are executed by the client and the server in parallel in a distributed manner, which may relieve the load of the server. Meanwhile, the Mashup applications related to user terminal capabilities and data can ensure security of user privacy properly, and the data may not be uploaded to a network, so as to avoid infringing upon the user privacy, and support more personalized service selection.

It should be noted that, if the server supports more than two clients in sharing one Mashup application logic, and different clients bind different local services, the result of the specific service invoked by the server can be shared among different clients. When an action of a client affects the state in the server, the server can synchronize the Mashup service of different clients through a synchronization operation performed between the server and the client, which may prevent the server from invoking the third-party service repeatedly.

Figure 2:
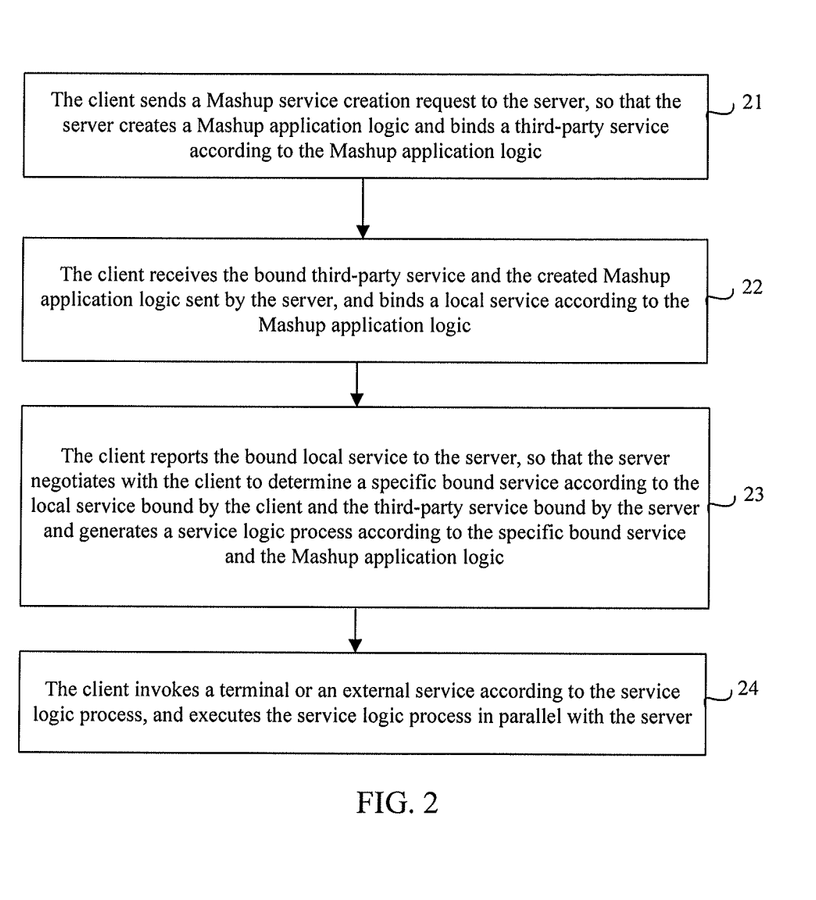
FIG. 2 is a flowchart of another service Mashup method implemented through dynamic cooperation of a client and a server according to an embodiment of the present invention.

Correspondingly, as shown in FIG. 2, an embodiment of the present invention provides another service Mashup method implemented through dynamic cooperation of a client and a server. The method includes the following steps:

Step 21: The client sends a Mashup service creation request to the server, so that the server creates a Mashup application logic and binds a third-party service according to the Mashup application logic.

Step 22: The client receives the bound third-party service and the created Mashup application logic sent by the server, and binds a local service according to the Mashup application logic.

Step 23: The client reports the bound local service to the server, so that the server negotiates with the client to determine a specific bound service according to the local service bound by the client and the third-party service bound by the server and generates a service logic process according to the specific bound service and the Mashup application logic.

Step 24: The client invokes a terminal or an external service according to the service logic process to execute the service logic process in parallel with the server.

In the execution process, when synchronization with the server is required, the client sends a synchronization request to the server or waits for synchronization information from the server.

Likewise, in the service Mashup method implemented through dynamic cooperation of the client and the server in the embodiment of the present invention, the server creates Mashup application logics, and then Mashup applications are decoupled from third-party data sources, a direct interface between the client and each type of third-party data is shielded, and the creation of Mashup applications is simplified. The server negotiates with the client to determine the specific bound service, which can balance the processing capabilities of the client and the processing capabilities of the server; the Mashup application logics are distributed according to actual conditions, and are executed by the client and the server in parallel in a distributed manner, which may relieve the load of the server. Meanwhile, the Mashup applications related to user terminal capabilities and data can ensure security of user privacy properly, and the data may not be uploaded to a network, so as to avoid infringing upon the user privacy, and support more personalized service selection.

The following uses a detailed instance to describe the foregoing method. The scenario of the Mashup application is: with the current location of a user as the center, displaying a map, and marking photos and news events around the current location of the user onto the map. A location service may be nested in the map, photos and news services. The created Mashup application logic is detailed below:

```
<Mashup id="usecase">
    <map action="create" id="map_canvas">
        <location action="getCurrentPosition" id="user_position"/>
    </map>
    <map action="addMarker" id="map_canvas">
        <event action="search" id="event_collection">
        <location id="user_position"/>
        </event>
    </map>
    <map action="addMarker" id="map_canvas">
        <photo action="search" id="photo_collection">
            <location id="user_position"/>
        </photo>
    </map>
</Mashup>
```

The server binds a third-party service according to the Mashup application logic. For example, the bound third-party service is the following description information about registration with Google Maps:

```
<?xml version="1.0" encoding="UTF-8" standalone="yes"?>
<application   xmlns:xs="http://www 3 rg/2001/XMLSchema"
        xmlns:xsi="http://www 3 rg/2001/XMLSchema-instance"
        xmlns:xsd="http://www 3 rg/2001/XMLSchema"
        xmlns="http://research un om/wadl/2006/10">
<resources base="http://maps oogle om/">
    <resource path="staticmap">
    <method name="GET" mref="getMapImage">
        <request>
            <param style="query" required="true"
            name="key" fixed="xxx"/>
            <param style="template" required="true"
            name="lat" type="xs:double"/>
            <param style="template" required="true"
            name="lng" type="xs:double"/>
            <param style="query" required="true"
            name="center" fixed="{lat},{lng}"/>
            <param style="template" required="true"
            name="width" type="xs:int"/>
            <param style="template" required="true"
            name="height" type="xs:int"/>
            <param    style="query"    required="true"
            name="size" fixed="{width}x{height}"/>
            <param style="query" required="true"
            name="zoom" type="xs:int"/>
            <param style="query" required="false" name="maptype"/>
            <param style="query" required="false" name="markers"/>
        </request>
        <response>
            <param name="map_url" style="plain"
            fixed="{request ri}"/>
                <representation mediaType="application/octet-
                stream">
                </representation>
        </response>
    </method>
    </resource>
</resources>
</application>
```

To bind the specific service dynamically, the server needs to map a Web application description language (Web Application Description Language, WADL) to an abstract Tag.

According to the Mashup service above, the server may bind the map onto google Map specifically according to the registration information of the third-party service. Depending on the action, the invoking form is specifically replaced with an operation on google Map. For example, in http://maps oogle om/staticmap?center=X (40.714728), Y(−73.998672) &zoom=12&size=400×400, the longitude and the latitude of the Center are invoked through a location service. The service may be bound to a GPS function of a mobile phone by the client, and the client transfers the X value and the Y value onto the server. Likewise, the event may be bound to the API service of The New York Times, and the relevant news can be searched out around the user's location; and the photo may be bound to the picture retrieval API of Flickr.

Upon completion of the binding, the Mashup application logic process begins: First, execute a Location operation; according to the Location, create a Map, and then execute operations of searching for news and searching for photos simultaneously. Because both the search for news and the search for photos require use of Location information, and the Location ID is given in the service logic, the preceding Location information may be directly used.

In the service binding operation of the Mashup application, the Location service is bound to a local GPS service, and is directly invoked by the client. Therefore, at the beginning, the client needs to lock the Tag of the Map operation of the server. After executing the GPS function and obtaining a result, the client sends a request for canceling the locking and updates the location information onto the server. The server runtime environment continues to execute the subsequent Mashup application logic.

Figure 3:
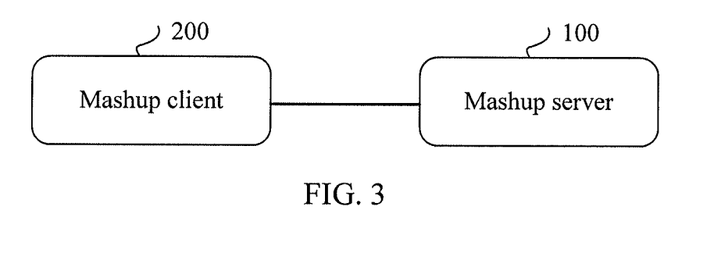
FIG. 3 is a schematic diagram of composition of a service Mashup system implemented through dynamic cooperation of a client and a server according to an embodiment of the present invention.

Based on the foregoing method embodiment, as shown in FIG. 3, an embodiment of the present invention provides a service Mashup system implemented through dynamic cooperation of a client and a server. The system includes a Mashup server 100 and a Mashup client 200.

The Mashup server 100 is configured to: create a Mashup application logic after receiving a Mashup service creation request sent by the Mashup client 200; bind a third-party service according to the Mashup application logic, and send the bound third-party service and the created Mashup application logic to the client, so that the client binds a local service of the client according to the Mashup application logic; negotiate with the client to determine a specific bound service according to the local service bound by the client and the third-party service bound by the server; generate a service logic process according to the specific bound service and the Mashup application logic, then invoke the specific service according to the service logic process to execute the service logic process in parallel with the client.

The Mashup client 200 is configured to: send the Mashup service creation request to the server, so that the server creates the Mashup application logic and binds the third-party service according to the Mashup application logic; receive the bound third-party service and created Mashup application logic sent by the server, bind the local service according to the Mashup application logic, and report the bound local service to the server, so that the server negotiates with the client to determine the specific bound service according to the local service bound by the client and the third-party service bound by the server and generates the service logic process according to the specific bound service and the Mashup application logic; invoke a terminal or an external service according to the service logic process to execute the service logic process in parallel with the server.

Figure 4:
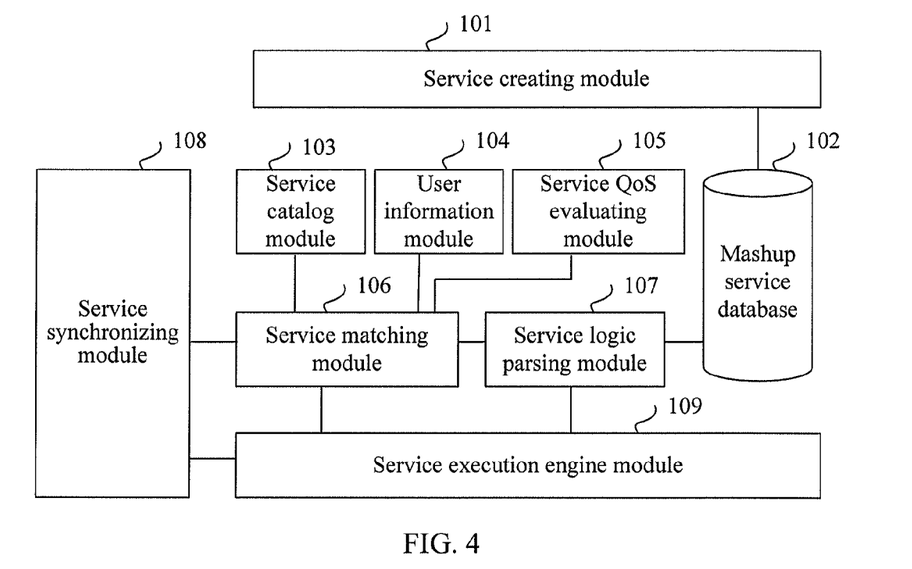
FIG. 4 is a schematic diagram of functional modules of a Mashup server according to an embodiment of the present invention.

As shown in FIG. 4, a Mashup server provided in an embodiment of the present invention may include a service creating module 101, a service matching module 106, a service logic parsing module 107, a service synchronizing module 108, and a service execution engine module 109.

The service creating module 101 is mainly used by a Mashup service creator to create a Mashup application logic. This module supports a simple abstract Mashup service creation mode, and a user pays attention mainly to a Mashup application requirement and does not need to specifically care about a third-party service interface. Through simply built-in extended TAG and Java Script objects or by other means, the Mashup server creates a Mashup application logic and invokes specific services.

The service matching module 106 is mainly configured to: bind a third-party service according to the Mashup application logic created by the service creating module 101, and send the bound third-party service and the created Mashup application logic to a client, so that the client binds a local service of the client according to the Mashup application logic; and negotiate with the client to determine a specific bound service according to the local service bound by the client and the third-party service bound by the server.

The service logic parsing module 107 is mainly configured to analyze relevant abstract logic parts in a Mashup service database, and generate a service logic process according to the services and data source information corresponding to a series of built-in extended Tags or Java Script objects in a Mashup service.

The service synchronizing module 108 is mainly configured to synchronize the state information between the client and the server in the process of negotiating and executing the Mashup service. The synchronization includes: negotiating the service binding process of the client and the server, notifying the state change in the service execution process of the client and the server, transferring parameters, and so on.

The service execution engine module 109 is mainly configured to invoke a specific service according to the specific service logic process processed by the service logic parsing module 107 and the service matching module 106, and send a synchronization request through the service synchronizing module 108 or wait for synchronization information from the client when synchronization with the client is required in the execution process.

Further, still as shown in FIG. 4, the Mashup server provided in an embodiment of the present invention may further include: a Mashup service database 102, a service catalog module 103, a user information module 104, and a service QoS evaluating module 105.

The Mashup service database 102 is mainly configured to store the Mashup application logic created by the service creating module 101. The application logic is not executable until the service matching module 106 binds an abstract Tag or JS object to the specific service.

The service catalog module 103 is mainly configured to store third-party services or data source information available to the Mashup server, and store mapping between abstract Tags or Js objects provided by the Mashup server and specific services.

The user information module 104 is mainly configured to store related information published by a user, for example, user preference. At the time of matching a specific service, the service may be selected according to the user preference, such as a rule for selecting a service among the same type of services.

The service QoS evaluating module 105 is mainly configured to evaluate QoS information, such as response time and error probability, of relevant services and data sources in the execution process. The service matching module 106 may use QoS information for reference when binding the specific service.

In this way, the service matching module 106 is specifically configured to bind the specific service in the service catalog module 103 according to the Mashup application logic in the Mashup service database 102 and with reference to the user information in the user information module 104 and the QoS information of the relevant services and data sources in the service QoS evaluating module 105.

Figure 5:
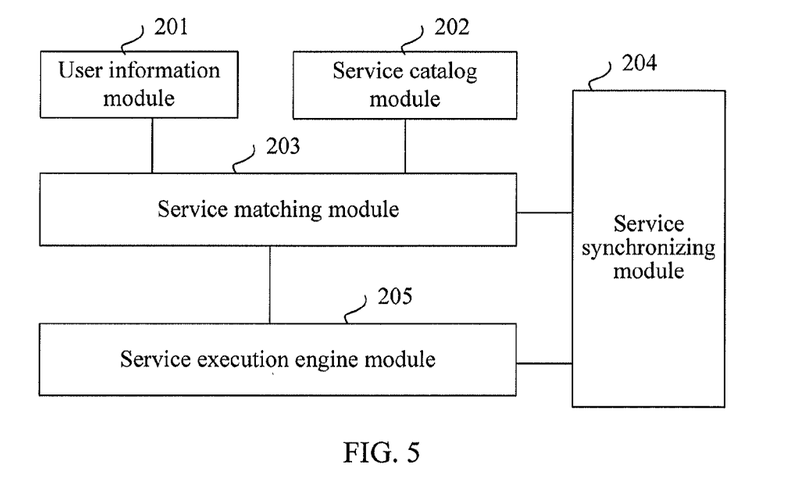
FIG. 5 is a schematic diagram of functional modules of a Mashup client according to an embodiment of the present invention.

As shown in FIG. 5, a Mashup client provided in an embodiment of the present invention may include a service matching module 203, a service synchronizing module 204, and a service execution engine module 205.

The service matching module 203 is mainly configured to: send a Mashup service creation request to a server, so that the server creates a Mashup application logic; receive the Mashup application logic created by the server and a third-party service that is bound according to the Mashup application logic; and bind a local service according to the Mashup application logic. It should be noted that, when the client matches a specific service according to the abstract Mashup application logic delivered by a Mashup server, invoked services may be personal information of a user that is based on a terminal or involved in certain services and is not suitable for running on the server. All such services are bound by the service matching module 203 of the client on a terminal side directly at the time of executing the service.

The service synchronizing module 204 is mainly configured to synchronize the state information between the client and the server in the process of negotiating and executing a Mashup service. The synchronization includes: negotiating the service binding process of the client and the server, notifying the state change in the service execution process of the client and the server, transferring parameters, and so on.

The service execution engine module 205 is mainly configured to invoke a terminal or an external service according to the specific service logic processed by the service matching module 203, and send a synchronization request through the service synchronizing module 204 or wait for synchronization information from the server when synchronization with the server is required in the execution process.

Further, still as shown in FIG. 5, the Mashup client provided in an embodiment of the present invention may include: a user information module 201 and a service catalog module 202.

The user information module 201 is mainly configured to store private information of the user, and send relevant information to the user information module 104 on the server after user permission is got. The relevant information is used for reference in matching the service, and the private information includes user preference and relevant resources of the user, such as a personal calendar of the user. At the time of matching a specific service, the service may be selected according to specific user preference, such as a rule for selecting a service among the same type of services.

The service catalog module 202 is mainly configured to store terminal-related service and resource information, and also store mapping between services and external service information, where the mapping can be directly invoked by a terminal. With diversification of terminal functions, a terminal device can provide various capabilities through software and hardware. The capabilities include PGS, license, sensor function, and relevant software functions. The service catalog module 202 describes the capabilities uniformly, and may describe third-party services executable by the terminal. A Mashup application can retrieve capabilities from a service catalog when invoking such capabilities.

In this way, the service matching module 203 is specifically configured to bind a local service in the service catalog module 202 with reference to the private information of the user in the user information module 201 and according to the Mashup application logic created by the server.

The following gives details about the mechanism of synchronization between the server and the client.

Figure 6:
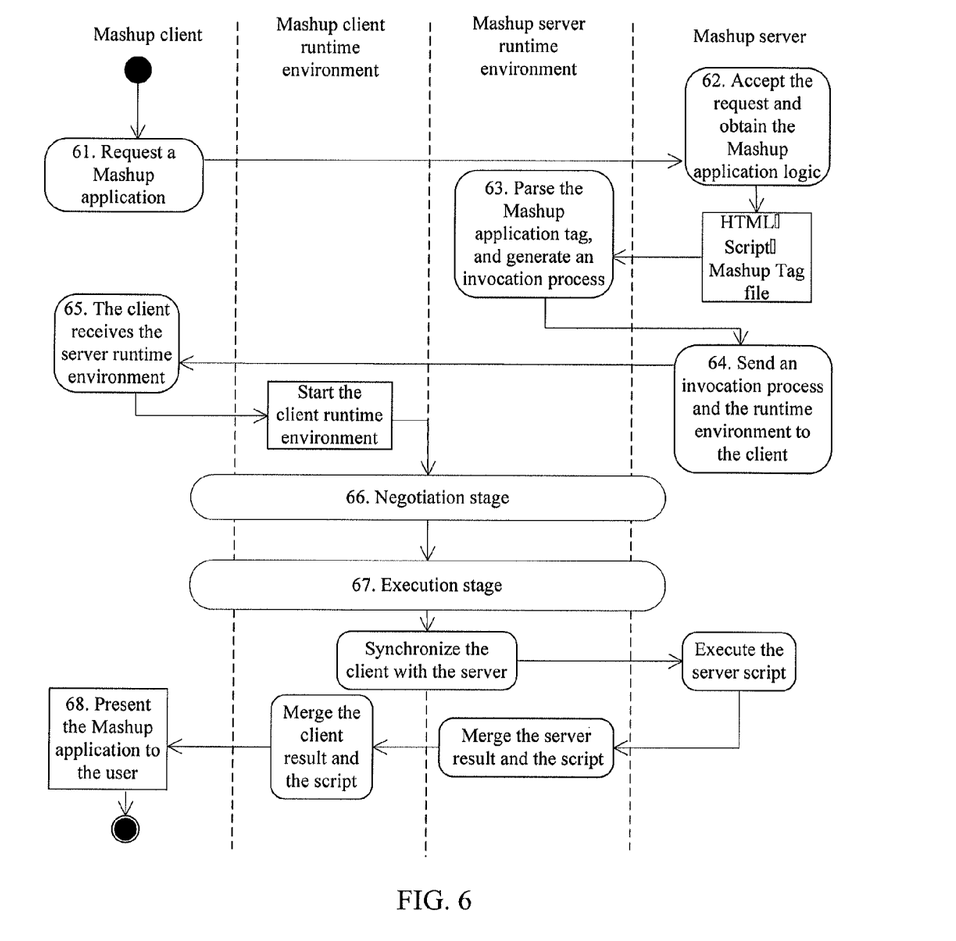
FIG. 6 is a schematic diagram of a synchronization mechanism between a server and a client according to an embodiment of the present invention.

When a user requests a Mashup application, the server cooperates with the client to implement a Mashup service. That is, the Mashup application logic may be processed on the client and the server in parallel. The processing includes two stages: negotiation, and execution. As shown in FIG. 6, the detailed process is as follows:

61. A user sends a Mashup service creation request to a server.

62. The server receives the request, and generates, according to the request, a Mashup application logic that is based on an HTML Tag or Java Script object.

63. A service logic parsing module in the runtime environment of a Mashup server parses relevant extended tags or objects, and according to the mapping, generates a process of invoking a relevant external service.

64. The server transfers an invocation process and the server runtime environment to a client.

65. The client receives the server runtime environment, and starts a client runtime environment.

66. The client runtime environment starts to negotiate with the server runtime environment. The negotiation is to exchange relevant synchronization state information when a service matching module of the client and a service matching module of the server bind specific services. For example, when the client binds a specific service according to user information, the service may affect the service binding performed by the server. In this case, service binding information of the client needs to be notified to the server, and finally, the negotiation process of a Mashup application is implemented between the server and the client.

67. The server and the client each start to execute the Mashup application logic. During the execution, states also need to be synchronized as required. The client cooperates with the server according to the service logic invocation process. For example, when the client needs to use certain results of the server, the client needs to learn the running progress of the server, to learn whether waiting is required, and so on. In this case, the server sends an execution result to the client, and the client presents the Mashup application to the user by merging the execution results of the server and the client.

To facilitate the cooperation between the server and the client to implement a Mashup service, relevant operation messages need to be defined between the server and the client. The operation messages are shown in Tables 1-5:

TABLE 1

General messages

| Operation | Description | Direction |
|---|---|---|
| bindServices(ServiceDescription) | Bind or rebind services: Tag, TagID | Client <-> server |
| Abort(MashupID) | Abort: Error code, description | Client <-> server |

TABLE 2

Negotiation messages

| Operation | Description | Direction |
|---|---|---|
| getPerferences | Obtain user preference name and value for reference in binding external services | Client -> server |
| executeMashup(MashupXML) | Start Mashup execution, bind services corresponding to tags: Tag, TagID, and Service information | Client <- server |
| executeFlow(workflow) | Execute the workflow | Client <- server |

TABLE 3

Execution messages

| Operation | Description | Direction |
|---|---|---|
| updateInput(InputID) | Update workflow parameters: InputID, value | Client <-> server |
| replaceService | Replace local services: service information | Client, server |
| deleteService | Delete local services: service information | Client, server |

TABLE 4

Synchronization messages

| Operation | Description | Direction |
|---|---|---|
| getState(TagID) | The client obtains the MashupTag execution state (TagState) of the server | Client -> server |
| lockState(TagID) | The client obtains and locks the MashupTag state (TagState) of the server | Client -> server |
| sendSynchronization(ChannelID) | Send a synchronization signal. The receiver cancels the locking state upon receiving the operation | Client, server |

TABLE 5

Message parameters

| Parameter | Description |
|---|---|
| File | A file that includes MashupXML |
| MashupXML | An XML document of a Mashup application |
| Workflow | Mashup workflow |
| ServiceDescription | Service description information |
| Tag | uMASH tag |
| MashupID | Mashup ID |
| InputID | Input parameters |
| ChannelID | Signal ID |
| TagID | Tag ID |
| TagState | Tag state |

Figure 7:
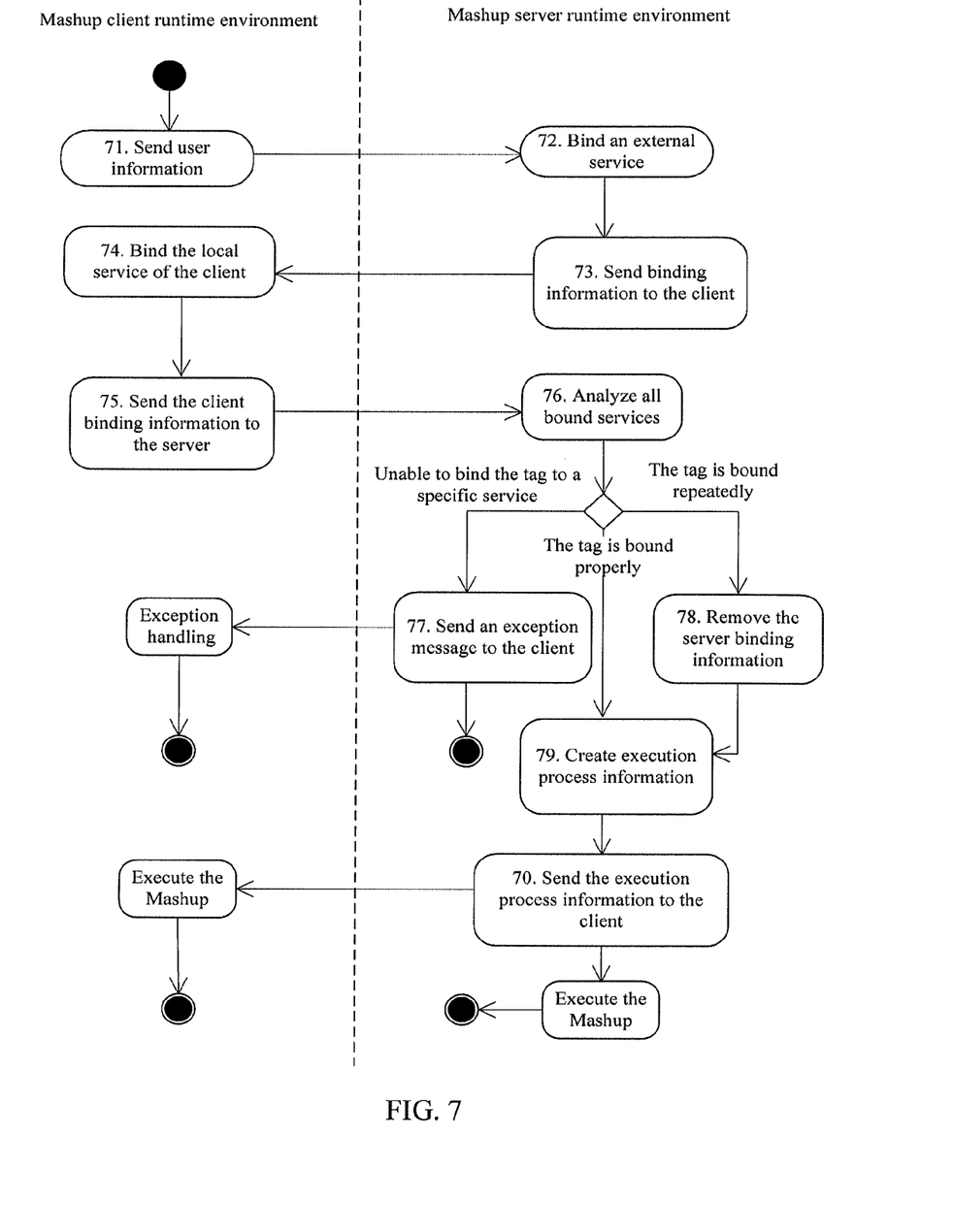
FIG. 7 is a flowchart of negotiating a runtime environment between a server and a client according to an embodiment of the present invention.

As shown in FIG. 7, the process of negotiating a runtime environment between a server and a client is as follows:

71. The client sends published preference information to a server runtime environment according to the running requirement of the server.

72. The server runtime environment binds a corresponding external service according to relevant information of a user.

73. The server runtime environment sends binding information to the client.

74. A client runtime environment binds the local service of the client according to its own relevant capabilities.

75. The client runtime environment sends information of the bound local service of the client to the server.

76. The server runtime environment analyzes binding information of all services.

77. If it is found that some Tags cannot be bound to specific services, it indicates that a Mashup application cannot be executed, and exception handling is required.

78. If some tags are bound by a client and a server repeatedly, the tag binding information of the server is removed.

79. If all Tags are bound to the services normally, execution process information is created according to all binding information and relevant nesting relationships.

70. The server runtime environment sends the created execution process information to the client, and the client and the server execute the Mashup application synchronously to invoke a local service and an external third-party service.

In the workflow execution process, when a state changes, the server or client sends a synchronization request or waits for synchronization, and generates input/output variables between services according to the nesting relationship between tags to facilitate synchronization in the workflow execution process.

Figure 8A:
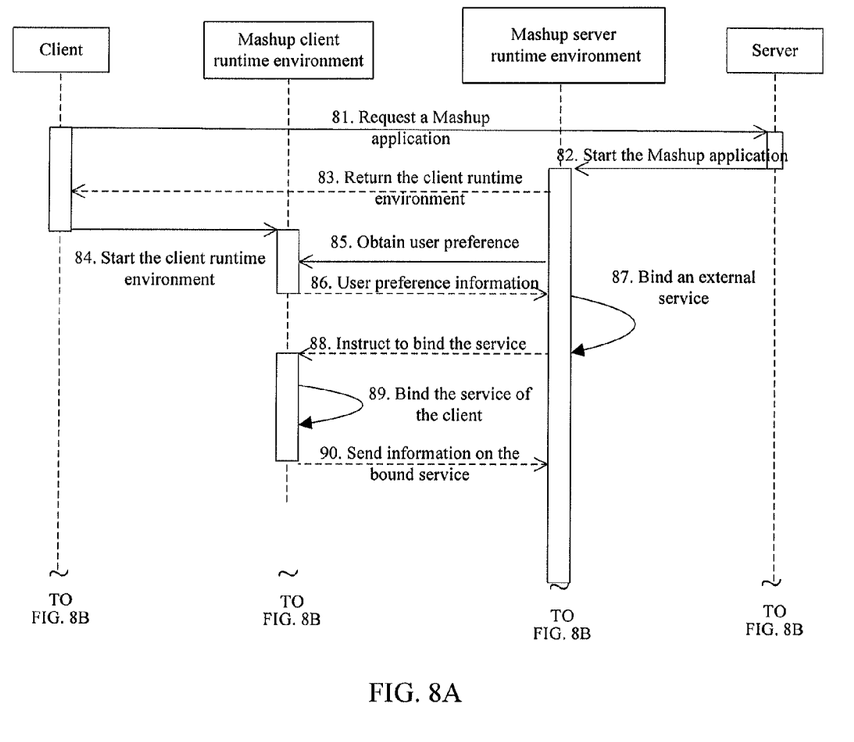
FIG. 8A and FIG. 8B are a flowchart of executing a Mashup application according to an embodiment of the present invention.
Figure 8B:
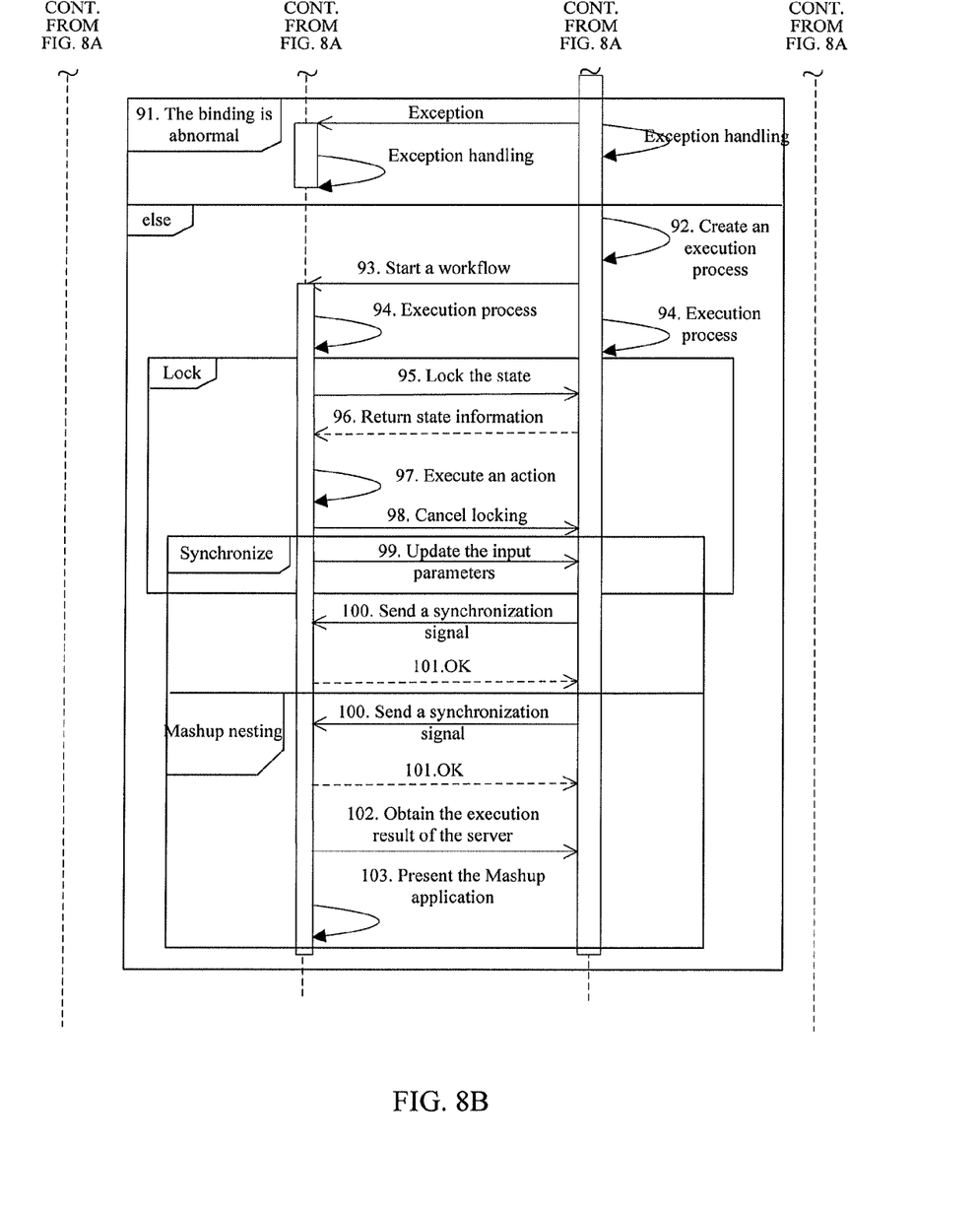

As shown in FIG. 8A and FIG. 8B, a detailed Mashup application execution process is as follows:

81. A client (such as a browser) requests a Mashup application.

82. A server obtains a service logic file of the Mashup application, and delivers the service logic file to a server runtime environment to start the Mashup application.

83. The server runtime environment returns relevant information of the client runtime environment of the Mashup application to the client according to the Mashup application.

84. The client starts the client runtime environment of the Mashup application.

85. The server runtime environment requests user preference information.

86. The client runtime environment returns the user preference information.

87. The server runtime environment binds a relevant external service.

88. The server runtime environment instructs the client runtime environment to bind the local service of the client.

89. The client runtime environment binds the local service of the client.

90. The client runtime environment sends the information of the bound service of the client to the server runtime environment.

The server analyzes the binding information of all services.

91. If the binding is abnormal, exception handling is performed, and the client runtime environment is instructed to perform exception handling.

92. If all bindings are normal, the server creates an execution process of a Mashup service according to all binding information.

93. The server runtime environment instructs the client runtime environment to start execution of the service process.

94. The server runtime environment and the client runtime environment invoke a relevant service synchronously.

95. The client runtime environment may lock the service invocation of the server temporarily as required by the service process.

96. The server runtime environment returns the state information of the service process to the client runtime environment.

97. The client runtime environment performs relevant operations according to the information of invocation of the local service.

98. Upon completion of the execution, the client runtime environment cancels the locking state of the server.

99. When synchronization processing is required in the service execution process, the client runtime environment updates relevant input parameters to the server runtime environment.

100. The server runtime environment sends a synchronization signal to the client runtime environment.

101. The client runtime environment makes a response.

102. The client obtains the execution result of the server.

103. The client merges the execution result of the server and the execution result of the client, and presents the Mashup application to a user.

It should be noted that, when a Mashup server supports multiple clients, different users can bind their own different services according to different preference at the time of executing the Mashup application. User data invoked by the Mashup application cannot be shared and the user data of each user varies, but a Mashup application logic can be shared. For example, a Mashup application function displays friend information (such as state and signature) on a map, and a shared map is processed by the server uniformly, but specific information displayed to different users is different. In this way, information needs to be synchronized between the server and multiple clients. For example, actions, such as map scale update, require synchronization between all terminals.

For the interaction between units and related information in the server embodiment, client embodiment, and system embodiment of the present invention, reference may be made to the relevant processes provided in the foregoing method embodiments. The detailed functions and processes are not repeated herein.

Persons of ordinary skill in the art should understand that all or part of the steps of the method provided in the embodiments above may be implemented by a program instructing relevant hardware. The program may be stored in computer readable storage media. When the program runs, the program executes the steps of the method specified in any embodiment above. The storage media may be a magnetic disk, CD-ROM, read-only memory (Read-Only Memory, ROM), or random access memory (Random Access Memory, RAM).

All functional units in the embodiments of the present invention may be integrated into one processing module, or each functional unit exists independently, or two or more of the units are integrated into one module. The integrated module may be implemented in the form of hardware or a software functional module. When being implemented as a software functional module and sold or used as a stand-alone product, the integrated module may be stored in a computer-readable storage medium. The storage medium may be a read-only memory, magnetic disk, or CD-ROM.

The above specific embodiments do not impose limitation on the invention, and modifications and variations made by persons of ordinary skill in the art without departing from the principle of the invention should fall in the protection scope of protection defined by the following claims or equivalents thereof.

What is claimed is:

1. A service Mashup method implemented through dynamic cooperation of a client and a server, comprising:
    creating, by the server, a Mashup application logic after receiving a Mashup service creation request sent by the client;
    binding, by the server, a third-party service according to the Mashup application logic, and sending the bound third-party service and the created Mashup application logic to the client, so that the client binds a local service of the client according to the Mashup application logic; and negotiating with the client to determine a specific bound service according to the local service bound by the client and the third-party service bound by the server;
    generating, by the server, a service logic process according to the specific bound service and the Mashup application logic; and
    invoking, by the server, the specific service according to the service logic process to execute the service logic process in parallel with the client.

2. The service Mashup method according to claim 1, wherein the creating the Mashup application logic comprises:
    using, by the server, a self-contained structured language to generate the Mashup application logic that is based on an HTML Tag or a Java Script object.

3. The service Mashup method according to claim 1, wherein:
    the binding, by the server, the third-party service according to the Mashup application logic comprises:
    binding, by the server, the third-party service according to the Mashup application logic by referring to QoS information of the server and information that is dynamically reported by the client as permitted.

4. The service Mashup method according to claim 1, wherein:
    the negotiating, by the server, with the client to determine the specific bound service according to the local service bound by the client and the third-party service bound by the server comprises:
    when the local service bound by the client is the same as the third-party service bound by the server, using the service that is commonly bound by the client and the server; and
    using preferentially the local service bound by the client when the local service bound by the client is different from the third-party service bound by the server.

5. The service Mashup method according to claim 1, wherein:
    the executing, by the server, the service logic process in parallel with the client comprises:
    performing, by the server and the client, synchronization operations based on different service execution states; and
    requesting locking a correlated state, executing a correlation action, and sending correlated parameters to an opposite party, when the server or the client requires information from the opposite party.

6. The service Mashup method according to claim 1, wherein:
    when the server supports more than two clients in sharing one Mashup application logic, and different clients bind different local services, the method further comprises:
    sharing results of a specific service bound by the server among different clients; and synchronizing Mashup services of different clients through a synchronization operation between the server and the client when an action of the client affects a state in the server.

7. The service Mashup method according to claim 2, wherein:
    when the server supports more than two clients in sharing one Mashup application logic, and different clients bind different local services, the method further comprises:
    sharing results of a specific service bound by the server among different clients; and synchronizing Mashup services of different clients through a synchronization operation between the server and the client when an action of the client affects a state in the server.

8. The service Mashup method according to claim 3, wherein:
    when the server supports more than two clients in sharing one Mashup application logic, and different clients bind different local services, the method further comprises:
    sharing results of a specific service bound by the server among different clients; and synchronizing Mashup services of different clients through a synchronization operation between the server and the client when an action of the client affects a state in the server.

9. The service Mashup method according to claim 4, wherein:
    when the server supports more than two clients in sharing one Mashup application logic, and different clients bind different local services, the method further comprises:
    sharing results of a specific service bound by the server among different clients; and synchronizing Mashup services of different clients through a synchronization operation between the server and the client when an action of the client affects a state in the server.

10. The service Mashup method according to claim 5, wherein:

when the server supports more than two clients in sharing one Mashup application logic, and different clients bind different local services, the method further comprises:

sharing results of a specific service bound by the server among different clients; and synchronizing Mashup services of different clients through a synchronization operation between the server and the client when an action of the client affects a state in the server.

11. A service Mashup method implemented through dynamic cooperation of a client and a server, comprising:

sending, by the client, a Mashup service creation request to the server, so that the server creates a Mashup application logic and binds a third-party service according to the Mashup application logic;

receiving, by the client, the bound third-party service and the created Mashup application logic sent by the server, and binding a local service according to the Mashup application logic;

reporting, by the client, the bound local service to the server, so that the server negotiates with the client to determine a specific bound service according to the local service bound by the client and the third-party service bound by the server and generates a service logic process according to the specific bound service and the Mashup application logic; and invoking, by the client, the specific bound service according to the service logic process to execute the service logic process in parallel with the server.

12. The service Mashup method according to claim 11, wherein:

the binding, by the client, the local service according to the Mashup application logic comprises:

binding, by the client, the local service by referring to private information of a user and terminal-related service and resource information and according to the Mashup application logic created by the server.

13. A Mashup server, comprising:

a service creating module, configured to create a Mashup application logic according to a Mashup service creation request sent by a client;

a service matching module, configured to: bind a third-party service according to the Mashup application logic created by the service creating module, and send the bound third-party service and the created Mashup application logic to the client, so that the client binds a local service of the client according to the Mashup application logic; and negotiate with the client to determine a specific bound service according to the local service bound by the client and the third-party service bound by the server;

a service logic parsing module, configured to generate a service logic process according to the specific bound service and the Mashup application logic;

a service execution engine module, configured to invoke the specific service according to the service logic process to execute the service logic process in parallel with the client; and a service synchronizing module, configured to synchronize state information between the client and the server during negotiation and execution of a Mashup service.

14. The Mashup server according to claim 13, further comprising:

a Mashup service database, configured to store Mashup application logics created by the service creating module;

a service catalog module, configured to store third-party services or data source information available to the Mashup server, and store mapping between the Mashup application logics generated by the Mashup server and specific services;

a user information module, configured to store public information of a user and information that is dynamically reported as permitted by the user; and a service QoS evaluating module, configured to evaluate QoS information of relevant services and data sources in an execution process; wherein the service matching module is specifically configured to bind specific services in the service catalog module according to the Mashup application logic in the Mashup service database and by referring to user information in the user information module and the QoS information of the relevant services and data sources in the service QoS evaluating module.

15. A Mashup client, comprising:

a service matching module, configured to: send a Mashup service creation request to a server, so that the server creates a Mashup application logic; receive the Mashup application logic created by the server and a third-party service that is bound according to the Mashup application logic; and bind a local service according to the Mashup application logic;

a service execution engine module, configured to: report the local service bound by the service matching module to the server, so that the server negotiates with the client to determine a specific bound service according to the local service bound by the client and the third-party service bound by the server and generates a service logic process according to the specific bound service and the Mashup application logic;

invoke the specific service according to the service logic process to execute the service logic process in parallel with the server; and a service synchronizing module, configured to invoke a terminal or an external service according to the service logic process to execute the service logic process in parallel with the server.

16. The Mashup client according to claim 15, further comprising:

a user information module, configured to store private information of a user, and send relevant information to a Mashup server as permitted by the user; and a service catalog module, configured to store terminal-related services and resource information, and also information on mapping of services and external services that can be directly invoked by the terminal; wherein the service matching module is specifically configured to bind a local service in the service catalog module by referring to the private information of the user in the user information module and according to the Mashup application logic created by the server.

* * * * *